(12) United States Patent
Boulouednine et al.

(10) Patent No.: US 10,959,305 B2
(45) Date of Patent: Mar. 23, 2021

(54) CONTROLLING A LIGHTING DEVICE HAVING AT LEAST TWO ELECTRIC LIGHT SOURCES

(71) Applicant: OSRAM GmbH, Munich (DE)

(72) Inventors: Mourad Boulouednine, Neuried (DE); Ulrich Binder, Munich (DE); Michael Steyer, Stadtbergen (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 16/604,592

(22) PCT Filed: Apr. 4, 2018

(86) PCT No.: PCT/EP2018/058586
§ 371 (c)(1),
(2) Date: Oct. 11, 2019

(87) PCT Pub. No.: WO2018/189007
PCT Pub. Date: Oct. 18, 2018

(65) Prior Publication Data
US 2020/0068682 A1 Feb. 27, 2020

(30) Foreign Application Priority Data

Apr. 13, 2017 (DE) .......................... 10 2017 108 036

(51) Int. Cl.
*H05B 47/10* (2020.01)
*H05B 45/22* (2020.01)
(Continued)

(52) U.S. Cl.
CPC .............. *H05B 45/22* (2020.01); *G01J 3/465* (2013.01); *G01J 5/60* (2013.01); *G09F 19/205* (2013.01);
(Continued)

(58) Field of Classification Search
CPC ............ H05B 37/0227; H05B 37/0245; H05B 37/0254; H05B 37/0272; H05B 45/10;
(Continued)

(56) References Cited

U.S. PATENT DOCUMENTS

2003/0030808 A1* 2/2003 Marshall .................... G01J 1/32
356/406
2005/0200315 A1* 9/2005 Kwong .................. H05B 45/22
315/308
(Continued)

FOREIGN PATENT DOCUMENTS

| DE | 102010011408 A1 | 9/2011 |
| DE | 202011102479 U1 | 8/2012 |
| WO | 2009044330 A1 | 4/2009 |

OTHER PUBLICATIONS

International Search Report based on Application No. PCT/EP2018/058586, dated May 30, 2018, 2 pages (for reference purpose only).
(Continued)

*Primary Examiner* — Tung X Le
(74) *Attorney, Agent, or Firm* — Viering, Jentschura & Partner MBB

(57) ABSTRACT

A method may include supplying electric power to a first light source and a second light source of at least two light sources by at least one ballast so that the first light source and the second light source emit a first source light and a second source light with a first and second spectral light distribution, respectively. The method further includes superimposing the first and second source light using an optical unit such that the lighting device outputs light with a spectral superposition light distribution. The method further includes detecting the light outputted from the lighting device using a light distribution sensor that provides a sensor signal corresponding to a spectral light distribution of the detected light. The method further includes comparing the
(Continued)

sensor signal to a predefined spectral light distribution and adjusting the electric power supplied to the respective light source by the ballast based on the comparison.

16 Claims, 5 Drawing Sheets

(51) Int. Cl.
| | |
|---|---|
| *H05B 45/20* | (2020.01) |
| *H05B 45/50* | (2020.01) |
| *H05B 47/19* | (2020.01) |
| *H05B 45/37* | (2020.01) |
| *H05B 47/16* | (2020.01) |
| *H05B 45/10* | (2020.01) |
| *G01J 3/46* | (2006.01) |
| *G01J 5/60* | (2006.01) |
| *G09F 19/20* | (2006.01) |

(52) U.S. Cl.
CPC ............ *H05B 45/10* (2020.01); *H05B 45/20* (2020.01); *H05B 45/37* (2020.01); *H05B 45/50* (2020.01); *H05B 47/16* (2020.01); *H05B 47/19* (2020.01)

(58) Field of Classification Search
CPC ........ H05B 45/20; H05B 45/22; H05B 45/37; H05B 45/50; H05B 47/16; H05B 47/19
USPC ......................................... 315/152, 307, 312
See application file for complete search history.

(56) References Cited

U.S. PATENT DOCUMENTS

| | | | |
|---|---|---|---|
| 2006/0274286 A1* | 12/2006 | Morejon | G09G 3/3413 353/85 |
| 2009/0001253 A1* | 1/2009 | Blaut | G09G 3/3413 250/205 |
| 2010/0194291 A1 | 8/2010 | Ishiwata | |
| 2011/0109445 A1 | 5/2011 | Weaver et al. | |
| 2012/0326612 A1 | 12/2012 | Kirsten | |
| 2015/0296589 A1 | 10/2015 | Melanson et al. | |
| 2016/0323962 A1 | 11/2016 | Weaver | |
| 2020/0309687 A1* | 10/2020 | Fujiyama | G01N 21/3151 |

OTHER PUBLICATIONS

German Search Report based on Application No. 10 2017 108 036.8, dated Dec. 21, 2017, 7 pages (for reference purpose only).

* cited by examiner

CONTROLLING A LIGHTING DEVICE HAVING AT LEAST TWO ELECTRIC LIGHT SOURCES

CROSS-REFERENCE TO RELATED APPLICATIONS

The present application is a national stage entry according to 35 U.S.C. § 371 of PCT application No.: PCT/EP2018/058586 filed on Apr. 4, 2018; which claims priority to German patent application 10 2017 108 036.8 filed on Apr. 13, 2017; both of which are incorporated herein by reference in their entirety and for all purposes.

TECHNICAL FIELD

The present invention relates to a method for controlling a lighting device by adjusting electric power supplied to one or more light sources of the lighting device based on a comparison of a sensor signal corresponding to a spectral light distribution of detected light and comparing the sensor signal to a predefined spectral light distribution.

BACKGROUND

Methods, control devices, as well as lighting devices of the generic type are extensively known in the prior art such that a separate printed evidence is not required hereto. Lighting devices, the spectral distribution of the output light of which results as a superposition of source light with multiple different spectral light distributions of individually controllable light sources, get an increasingly more important significance in the area of the modern lighting technology. In order to be able to provide a desired predefined light distribution and spectral superposition light distribution, respectively, of the light output by the lighting device, the lighting device often includes at least two light sources, which emit source light with different spectral light distributions, which is superimposed by means of the optical unit, such that the lighting device outputs light with the superposition light distribution as superposition light. In that the individual light sources are controllable with respect to the intensity of the source light output by them, the spectral light distribution overall provided in the light by the lighting device as a spectral superposition light distribution can be adjusted at least in a predefined area. Among other things, this is used in lighting devices, the light sources of which are formed by light emitting diodes. However, the principle is not restricted to such light sources.

Problems can be seen in adjusting such lighting devices, in particular if they include multiple colored light sources of different color, for example red, green, blue, amber and optionally further, and optionally also comprise white light sources, for example warm white light sources (WW) and/or cold white light sources (CW), and dimming the control channels associated with the respective light sources such that the spectral superposition light distribution is output from the lighting device as a desired light distribution. Thus, spectral superposition light distributions are for example to be able to be generated such that a respective lighting device can output light at different color temperatures, can output light with a superposition light distribution, which can cause desired amplifying or compensating effects by means of the output light at lighted objects, and/or the like.

Moreover, it can be required that a lighting device satisfies predefined criteria, such as for example compliance with one or more industrial standards with respect to the spectral superposition light distribution, for example based on a Television Lighting Consistency Index (TLCI) standard, which for example serves as an evaluation standard for light and lighting in the field of the television and movie industry, or else standards for desired spectral light distributions for plant growth or optimum color reproduction in lighting of special objects. In particular, this can also be relevant to medical applications, because especially here color reproduction in particular in imaging methods is very important in diagnostics to improve the diagnosis, in particular to reduce a risk of false diagnoses. Moreover, this can also be relevant to industrial applications, in which both light amount and the spectral distribution of the light have to be qualitatively stable in a quality test, for example in a production. Errors in the produced goods can for example be recognized by color deviation. In order to avoid false messages, which can be erroneously triggered by varying light sources, a self-stabilizing light source can be extremely important to increase the productivity and/or to reduce a reject rate.

In practice, it has manifested that the light sources, which find use in lighting devices of the generic type, are subject to manufacturing variations, variations in the intended operation as well as also aging effects. For example, the spectral light distribution of a respective light source can be subject to scattering, from which particular requirements with respect to the control of this light source can result. Optionally, light sources are to be selected with respect to their spectral light distribution to be able to achieve a desired predefined superposition light distribution by the lighting device. Moreover, it can be provided that the powers supplied to the respective light sources have to be adapted to the source light output by the respective light sources with its spectral light distribution. This can vary from light source to light source such that practical threshold values for the supplied power can also deviate from values theoretically to be expected, for example according to a product specification or the like. Further, a light flux of the respective source light can change in different manner with increasing operating time and optionally depending on a preload of the respective light source. Thereby, the superposition light distribution of the light output by the lighting device can also correspondingly change in complex manner and in difficultly predictable manner. Accordingly, a once adjusted superposition light distribution will not remain constant with progressing operating time.

SUMMARY

A method and a control device are provided for performing the method and a lighting device to the effect that the light is output with an improved spectral superposition light distribution by means of the lighting device.

On the part of the method, it is in particular proposed for a generic method that at least the light output by the lighting device is detected by means of a light distribution sensor, which provides a sensor signal corresponding to a spectral light distribution of the detected light, the sensor signal is compared to a predefined spectral light distribution to provide at least one control signal for the at least one ballast depending on the comparison, and the electric power supplied to the respective light source is adjusted by means of the at least one ballast depending on the at least one control signal.

With respect to a generic control device, it is in particular proposed that it comprises an evaluation unit for connecting a light distribution sensor for detecting at least the light output by the lighting device, wherein the evaluation unit is formed to receive a sensor signal corresponding to a spectral light distribution of the light detected by means of the light distribution sensor, to compare the sensor signal to a predefined spectral light distribution, to provide at least one control signal for the at least one ballast depending on the comparison, to adjust the electric power supplied to the respective light source by means of the at least one ballast depending on the at least one control signal.

With respect to a generic lighting device, it is in particular proposed that it comprises a control device.

The method and lighting device can be achieved that the spectral superposition light distribution of the light output by the lighting device cannot only be analyzed, but an adaptation of an adjustment of the lighting device, in particular by means of the ballast, can be performed by feedback in the manner of control, such that the predefined spectral light distribution can be provided as well as possible by the lighting device as a superposition light distribution. Thus, the cooperation of the human usual in the prior art is no longer required to be able to perform a corresponding adjustment of the lighting device. Thereby, automated tracking can be achieved such that the lighting device outputs the light, preferably over its entire operating time, corresponding to the predefined spectral light distribution. Thus, an automated method for adjusting the spectral superposition light distribution is allowed in that the light distribution sensor can at least detect the light output by the lighting device. According to position of the light distribution sensor, the light distribution can also be detected at an object to be lighted preferably without human cooperation. Of course, embodiments are not restricted to use exactly one ballast. According to need, two or more ballasts can also be present, for example if the corresponding electric power is to be supplied to at least two light sources from different ballasts. For example, this can be beneficial if the at least two light sources have very different electric characteristics and the ballasts are formed specifically adapted to these characteristics. For example, it can be provided that multiple lighting devices with for example each one single light source are provided, the light sources of which are supplied with electric energy by respective ballasts, however, wherein these lighting devices are commonly operated, preferably to collectively light an object or multiple objects.

Thus, it is no longer required to ascertain a light flux behavior of the light sources, in particular if they are formed by light emitting diodes, depending on operating hours, for example in that the corresponding light flux for different supplied powers is measured in expensive measurement series, wherein an aging behavior to be expected can only be ascertained by means of extrapolation.

The light source is a functional unit of the lighting device, which emits the source light with a specific spectral light distribution immanent in the light source in predefinable manner upon supply with electric energy. —In non-limiting embodiments, the light source is a semiconductor light source, such as a light emitting diode (LED), a laser diode (LD), a super luminescence diode (SLD) and/or the like. Basically, the light source moreover can of course also be formed by a gas discharge lamp, which emits light in predefinable manner depending on a respective gas and/or further physical operating conditions upon supply with electric energy.

Therein, it can be taken into account that a change of a light source in cooperation with the simultaneous change of the other light sources of the same system is optionally of no consequence. However, if individual light sources or complete light source systems have to be maintained and replaced by failure, they can have higher initial light fluxes according to expectation on the one hand and secondly possibly no longer have the intended wavelength as in the original design. For example, a light emitting diode type can no longer be available and it has to be resorted to a new light emitting diode type with another wavelength. In addition, the replacement light emitting diode type can be replaced in other brightness or color location binnings. Then, without self-calibration to the default spectrum and the default light flux, a lamp from the compound of lamps would easily stand out as "new" and would clearly differ from the other ones. The light source system is considerably more tolerant with respect to such maintenances since a greater tolerance range can be accepted and compensated for. The new lighting device can then adapt to the group of the present lighting devices by adaptation of the spectral distribution and the light flux such that it does not negatively stand out.

Moreover, "tuneable white" applications become increasingly more important in the general lighting. Herein, two or more groups of white light emitting diodes, possibly also combined with colored light emitting diodes, are switched such that a color temperature range between for example 2,700 K and 6,000 K can be swept. Here, color-stable light emissions are also desirable and can be achieved.

In order that the respective light source emits the respective source light, the electric power is supplied to it from the ballast corresponding to a light flux to be output. Usually, a light flux of the light source is dependent on the supplied electric power. Thus, a brightness of the light source can for example be adjusted by means of the supplied electric power. Moreover, it can have to be taken into account that the spectral light distribution of the source light can at least slightly also be dependent on the supplied electric power. For example, this can be caused in that the light source adjusts its thermal state depending on the supplied electric power, which can optionally in turn have influence on the spectral light distribution of the source light.

The at least one ballast serves for supplying the electric power to the respective light source. The ballast does not only provide the required electric power, but it also provides it in a form adapted to the respective light source such that it can emit the desired source light in intended manner. Thus, light emitting diodes are for example supplied by means of a direct current to be able to achieve the desired light emission. According to operating mode, the direct current can also be clocked to thereby be able to achieve an output of source light as beneficial as possible. Clocking can for example be effected by means of pulse width modulation (PWWM) or the like.

The ballast preferably comprises a hardwire circuit, by means of which a corresponding energy transformation can be performed. The ballast obtains the required electric energy for example from a public energy supply network, to which it is connected, or it can also obtain the energy from an electric energy storage like an accumulator, a battery and/or the like. Of course, these energy sources can also be provided in combined manner. Moreover, the ballast can include a program-controlled computer unit, which allows being able to adjust the corresponding powers in predefined manner. The computer unit can also be combined with the hardware circuit. The computer unit is controlled by means of a computer program, which realizes the corresponding functionality by the computer unit. The computer program can be stored in a storage unit of the computer unit or the ballast provided separately hereto. Moreover, the ballast can comprise one or more control terminals, by means of which control signals can be supplied to it, which can serve to be able to adjust the corresponding powers for the light sources to be supplied. In the simplest case, it can be provided that the lighting device is turned on and off, respectively, by means of the control signal. Moreover, it can of course also be provided that a respective one of the light fluxes of the light sources can be adjusted by means of the control signal.

The source light emitted by the at least two light sources is superimposed by means of the optical unit of the lighting device. Hereto, the optical unit can include optically active elements, for example refractive elements like lenses, prisms and/or the like, reflective elements such as for example mirrors, in particular controllable micromirrors, DMDs (digital micromirror device), combinations hereof and/or the like.

The optical unit preferably provides a light entry opening for supplying the respective source light for each of the light sources. The superimposed light with the spectral superposition light distribution is then provided via a preferably common light exit opening. In non-limiting embodiments, the light exit opening is also a light exit opening of the lighting device at the same time. Moreover, the optical unit can comprise an own specifically associated optically active element at least for one of the light sources, for example a lens, mirror and/or the like associated with the respective light source.

The optical unit is a component of the lighting device and preferably arranged integrated in a housing of the lighting device. In non-limiting embodiments, the light sources are also at least partially arranged integrated in the housing of the lighting device. The lighting device further includes the ballast, which is preferably also arranged integrated in a housing of the lighting device. However, in alternative configurations, it can also be provided that the ballast comprises a separate housing, which is not encompassed by a housing of the lighting device itself. According to configuration, very different constructions can here be provided.

The spectral superposition light distribution is composed of the respective specific spectral light distributions of the source lights, which are superimposed by means of the optical unit. Thus, the superposition light distribution is dependent on the spectral light distributions of the source light provided by the light sources. In this manner, it is possible to change the superposition light distribution by changing a light flux of one or more light sources. Since the light sources emit source light with a different spectral light distribution, the spectral superposition light distribution can also be changed at the same time in this manner.

Moreover, there is of course the possibility that the optical unit also comprises additional elements, by means of which the spectral superposition light distribution can be influenced, for example by providing color filters or the like. For example, it can be provided that corresponding elements are provided for one or also multiple of the light sources in the optical unit and influence only the respective source light of the respective light source. For example, there is the possibility to provide a conversion substance, by means of which source light of a light source can be influenced with respect to the spectral light distribution. Thus, it can be provided that a light source emits ultraviolet light, which is for example converted into the color of amber by a conversion substance. Basically, the conversion substance can of course also be provided on the side of the light source.

According to non-limiting embodiments, the light output by the lighting device is detected by means of the light distribution sensor. The light distribution sensor is preferably a light-sensitive component, which provides a corresponding sensor signal depending on a light flux and/or a detected spectral light distribution of the detected light. The light distribution sensor is preferably a component, by means of which in particular a spectral distribution of the detected light can be measured. In non-limiting embodiments, the sensor signal is an electric signal. The electric signal can be an analog or also a digital signal. Moreover, the light distribution sensor can comprise multiple light-sensitive elements, the sensitivity of which is limited to a predefined spectral range of the detected light. Thereby, it is possible to detect a respective light flux depending on the respective spectral detection range and to generate a corresponding electric signal. The electric signal can also be further processed by means of a processing unit of the light distribution sensor, for example by combining it with the electric signals of other sensor elements to provide the control signal. Moreover, it can of course also be provided that more than one control signal is provided, for example a number of control signals, which is adapted to the number of the light sources or the like. In non-limiting embodiments, a respective one of the control signals is associated with a respective one of the light sources of the lighting device in this case. Of course, a combined control signal can also be overall provided, which preferably contains all of the data with respect to the spectral light distribution of the detected light.

The control signal or the control signals can be communicated to the ballast. For this purpose, it can be provided that the light distribution sensor is connected to the lighting device, in particular the ballast. The connection can be realized by a wireless or else a wired communication link. If the light distribution sensor is for example arranged within the housing of the lighting device, the light distribution sensor can preferably be connected to the ballast in wired manner. In contrast, if the light distribution sensor is for example arranged outside of the housing of the lighting device, it can also be provided that the light distribution sensor is connected via a wireless communication link like a radio link, in particular a short-range radio link, an infrared communication link, an ultrasonic link and/or the like.

The light distribution sensor can for example comprise at least one photosensitive element, preferably a plurality of photosensitive elements, which can for example be formed by semiconductor components or the like. For example, the elements can be formed by photodiodes, photocells and/or the like.

The control device comprises an evaluation unit for the procedure. The evaluation unit can be formed by a hardware circuit or else by a correspondingly established computer unit, which is controlled by means of a suitable computer program in suitable manner to provide the desired procedure as a functionality. Moreover, a hardware circuit can of course also be provided, by which the desired procedure can be at least partially realized.

The evaluation unit compares the sensor signal to a predefined spectral light distribution. The predefined spectral light distribution can be provided by corresponding data stored in a storage unit of the evaluation unit. In non-limiting embodiments, it is digital data. However, analog data can basically also be provided. The predefined spectral light distribution can be adjusted by means of an adjusting unit. However, it can also be provided that the predefined spectral light distribution is fixedly predefined in producing the lighting device such that it cannot be further changed during the use. Of course, a combination can also be provided, in which the predefined spectral light distribution can be adequately adapted in suitable manner by means of an external adjusting appliance.

A comparison function is provided by the evaluation unit, which optionally evaluates the sensor signal before the comparison to then be able to perform the comparison to the predefined spectral light distribution. This can in particular be provided if the control signal has a corresponding coding or the like. As a result of performing the comparison function, at least one control signal is provided for the ballast depending on the comparison. The ballast can be controlled by the control signal communicated from the control device to the ballast such that the desired electric power is supplied to the individual light sources in predefinable manner. Thereby, the light sources are excited to emission of the respective source light. Therein, the dependency can be selected such that a deviation of the sensor signal from the predefined spectral light distribution becomes as low as possible. Correspondingly, the control signal is ascertained by the evaluation unit and communicated to the ballast.

Thus, monitoring and adequately readjusting the superposition light distribution of the light output by the lighting device such that the light output by the lighting device has a superposition light distribution as predominantly as possible may occur, which corresponds to the predefined spectral light distribution as largely as possible. Thereby, in non-limiting embodiments, providing a feedback in the manner of a control such that a high-quality lighting device can be provided, which is capable of reliably outputting light according to the predefined spectral light distribution. In particular, in non-limiting embodiments, detecting variations with respect to the spectral superposition light distribution and compensating for them as far as possible, preferably completely, by suitable control of the light source. Thereby, long-term stability with respect to the light output by the lighting device can be achieved.

According to an advantageous development, it is proposed that light output of the light output by the lighting device is adjusted in automated manner by first ascertaining respective proportions of the source light of the respective light sources in a light flux of the light output by the lighting device and then effecting the adjustment of the respective powers supplied to the respective light sources depending on the respective ascertained proportions. Thereby, a beneficial automated configuration, in particular a first configuration, of the light output by the lighting device can be achieved, which can preferably be performed without human intervention. In particular, an initial adjustment of the light output of the lighting device can be achieved by applying the above mentioned method in the manner of a calibration method. Therein, it has manifested that it is advantageous to first adjust the light sources in descending order corresponding to the respective proportion, in particular percentage proportion, in the entire light flux, which is overall output by the lighting device. In non-limiting embodiments, the light source with the greatest proportion is first adjusted. Additionally or alternatively, an adjustment can also be provided such that a warm white light source is first adjusted before a cold white light source. Thereby, a reliable adjustment of the spectral superposition light distribution according to the predefined spectral light distribution can be fast achieved in simple manner.

Further, it is proposed that the adjustment of the power supplied to the respective light source is effected depending on an operating state stability of the respective light source with respect to the spectral light distribution of the source light output by it. Thus, it can be provided that light sources with a low operating state stability are adjusted before light sources with a great operating state stability. The operating state stability indicates how stable the emission of source light from the respective light source is at a predefined supplied electric power. This quantity can be dependent on an operating time, on further physical ambient temperatures like temperature, atmospheric boundary conditions and/or the like. Thereby, the adjustment of the lighting device can be further improved.

Furthermore, it is proposed that the adjustment of the power supplied to the respective light source is effected depending on a wavelength of an intensity maximum of the spectral light distribution of the source light output by the respective light source. Thus, it can be provided that light sources, the emission of the source light of which is more instable, are first adjusted, before light sources are adjusted, the emission of source light of which is more stable. Namely, it has manifested that light sources, in particular light emitting diodes, which output red light, have a lower operating state stability than light sources, which output blue light or the like. Since the light sources, which are employed, often are not monochromatic light sources, it proves advantageous if it is adjusted to the intensity maximum of the spectral light distribution of the respective source light. This can provide a good measure to be able to judge how stable a respective light source is with respect to the output of source light.

Thus, the calibration of the lighting device and the light sources thereof, respectively, can be effected in ordered manner according to a quantity of a possible color location shift depending on a temperature and an operating time, wherein a descending order is here preferred. In a practical example, it can be provided that the light sources are first adjusted, which are provided for output of source light at large wavelengths. Only thereafter, adjustment of the light sources is effected, which provide source light with lower wavelengths. Thus, it can be provided that a red light emitting diode as the light source is for example first adjusted, whereupon further light sources or light emitting diodes are adjusted thereafter, wherein the light source or light emitting diode is lastly adjusted, which provides blue source light.

An advantage of the above mentioned order of calibration is that it has manifested that white light sources usually provide the highest contribution to the light flux of the spectral superposition light and therefore calibration is here most efficient and most productive. Therein, in colored light sources, in particular if they are light emitting diodes, light sources, which output red light, most severely age with progressing operating time, from which it results that a deviation from a target spectrum is here most likely to be expected.

In non-limiting embodiments, the predefined spectral light distribution is determined by a color location and a luminance. By predefinition of the color location and the luminance, target values are known or predefined, which allow enabling a targeted procedure for optimally adjusting the lighting device in predefined manner, for example using an algorithm.

According to a development, it is proposed that only a control signal, the amount of which is greater than a predefined minimum value, is taken into account for adjusting the respective supplied power. This configuration has the advantage that a procedure does only have to be performed as far as an approach of the spectral superposition light distribution to the predefined spectral light distribution is possible. Therein, this development takes into account that spectral light distributions of a respective light source optionally varied for example due to aging or the like have varied such that completely matching the spectral superposition light distribution to the predefined spectral light distribution cannot be achieved even with most beneficial procedure. By predefinition of the minimum value, a criterion can be provided, which allows aborting the procedure as soon as a predefined measure of coincidence is achieved. Therein, the minimum value is preferably dimensioned such that the procedure can be performed during an entire lifetime. Of course, it can also be provided that the minimum value is dependent on the respective operating time of the lighting device, for example becomes greater with increasing operating time of the lighting device or the like. This takes into account that achieving the predefined spectral light distribution with increasing operating time of the lighting device can become increasingly difficult in lighting devices. Thus, it is avoided that a permanent variation or adjustment of the lighting device is performed in the form of endless control or feedback. This can be undesired for very different reasons, in particular because the characteristics of the light output by the lighting device of course also always change thereby. For lighting purposes, this can be undesired. By the minimum value, it can be achieved that disturbing light output by the lighting device is not generated hereby.

According to a development, it is proposed that individual physical characteristics of the respective light source are taken into account for adjusting the respective supplied power. For example, it has manifested that in particular in red light sources, the temperature can have an influence on the emission of the source light. For example, the spectral light distribution can also change depending on the temperature. In light sources, the emitted source light of which has a considerably shorter wavelength, in contrast, the influence of the temperature can be considerably lower. Moreover, further physical effects can of course also influence the light output, for example atmospheric boundary conditions, a pressure on the light source and the light emitting medium, respectively, and/or the like.

According to an advantageous development, it is further proposed that the light distribution sensor detects at least the light output by the lighting device in an area of an object lighted by means of the lighting device. Thereby, it is possible to detect the light, preferably at the object, which is lighted by the lighting device, and to provide a corresponding lighting function. Therein, it further proves advantageous that the light of the lighting device does not have to be exclusively detected by the light distribution sensor. Namely, if the object is also lighted by further light lighting devices and/or by ambient light at the same time, the entire light, which lights the object, can be detected. This allows being able to adjust the lighting device depending on further lighting sources. Thus, it can for example be provided that the ambient light, for example daylight, is taken into account for the procedure. Thus, it is possible to additionally take into account spectral variations of the daylight occurring over the course of the day in the light output provided by the lighting device. By the procedure, corresponding tracking can be achieved such that the lighted object is supplied substantially with a preferably constant spectral superposition light distribution of the light output by the lighting device in connection with the ambient light or the daylight. Thus, the object can always be substantially equally lighted.

It further proves advantageous if the predefined spectral light distribution is ascertained depending on physical characteristics of the lighted object. Physical characteristics of the object are not only a surface, a color, a material and/or the like, but also a sensitivity to radiation, in particular light. Thus, it is possible to additionally take into account physical characteristics of the lighted object and to provide a corresponding predefined spectral light distribution, which can be taken as a basis for the procedure. Thereby, it can be achieved that the object to be lighted is not supplied with light, which can be disturbing or detrimental to the object itself. For example, this problem can occur if a valuable painting or the like is to be lighted by the lighting device. It has manifested that in particular light with short wavelength can result in increased aging of such a painting, in particular its colors. In non-limiting embodiments, it is possible to select and maintain the predefined spectral light distribution such that the object to be lighted is not supplied with detrimental radiation as possible.

Moreover, it is proposed that the powers supplied to the respective light sources are adjusted depending on a spectral light distribution detected at the lighted object. Hereby, it is possible to detect not only the light output by the light sources of the lighting device and to use it for the procedure, but additionally also light of foreign light sources, in particular ambient light like the daylight or the like. Thereby, the procedure can be further improved.

Further, it is proposed that the light distribution sensor is, preferably wirelessly, in communication link with a control device for the lighting device. Thus, the light distribution sensor does not have to be immediately arranged at the lighting device or in the lighting device. It can be correspondingly arranged distant from it. Particularly preferably, the light distribution sensor can therefore be arranged at the lighted object, whereas the lighting device itself can be arranged distant from the object. Thereby, additional advantageous lighting possibilities can be achieved. Of course, the communication link can be wired. However, it proves particularly advantageous if the communication link is at least partially wirelessly formed. For this purpose, the communication link can be a radio link, for example based on short-range radio or the like using a suitable radio standard like WLAN, Bluetooth, ZigBee and/or the like. Further, the communication link can also use a communication network like the Internet or the like.

An advantageous development provides that the light distribution sensor is supplied with energy from an own energy supply unit. Thereby, the light distribution sensor can be operated virtually independently with respect to the lighting device. This configuration proves particularly advantageous in connection with a light distribution sensor arranged distant or separately from the lighting device. The energy supply unit can for example include an electric energy storage like an accumulator, a battery and/or the like for the purpose of energy supply. Moreover, it can of course be provided that the energy supply unit is connected to an energy supply network like the public energy supply network. However, the energy supply unit is particularly advantageously formed to convert also a part of the light into electric energy at the same time with the detection of the light, which can be provided for the intended operation of the light distribution sensor. Thereby, a particularly flexible and low-maintenance light distribution sensor can be achieved.

Moreover, it is proposed that the predefined spectral light distribution is ascertained from a spectral light distribution specified by a user considering the at least first and second spectral light distributions. Thereby, it is possible to adequately adapt the predefined spectral light distribution to the spectral light distribution specified by the user. In non-limiting embodiments, the predefined spectral light distribution for the lighting device is ascertained based on the spectral light distribution specified by the user. Hereto, characteristics of the light sources can be advantageously taken into account, in particular the individual spectral light distributions of the respective source light thereof.

It proves particularly advantageous if the spectral light distribution of each of the at least two light sources is individually detected at the object to be lighted by means of the light distribution sensor. This allows ascertaining the spectral superposition light distribution considering real environmental conditions in the area of the object or at the object. Thereby, the spectral light distribution specified by the user can be particularly accurately reproduced by the spectral superposition light distribution.

In the following, optimized adjustment of a spectral superposition light distribution is described.

Presently, a tristimulus value $T=(X, Y, Z)$ is in the focus for ascertaining the predefined spectral light distribution. The tristimulus value can for example be calculated according to the International Commission on Illumination (CIE), in particular according to CIE 15:2004, No. 7. The standard color values X, Y, Z can for example be ascertained according to DIN 5033 and similarly also according to CIS 15:2004. By predefining a color location x, y and a light intensity Y corresponding to the light distribution specified by the user, target values Xt, Yt, Zt are known, wherein "t" stands for "target". In vector notation, this can be represented as follows: $Tt:=(Xt, Yt, Zt)$. This value is provided for each light source and denoted by the value $T_i$, wherein i is a numbering variable for the individual light sources, which can preferably be formed by light emitting diodes.

In the operation of multiple light sources, the $T_i$ vectorially superimpose, in particular add, that is linearly with respect to the three vector components. Thus, the $T_i$ can linearly add with respect to the presently three components of the vectors for $i=1 \ldots n$ (n corresponds to the number of the light sources or light emitting diodes).

From respective spectra recorded at different supplied powers, preferably in selective manner, of each individual light source, the $T_i$ can be calculated for any power adjustment, whereby functions $X_i=f(Y_i)$ and $Z_i=g(Y_i)$ can be adapted. Upon control of light emitting diodes as light sources, in particular upon supply of a constant power or with pulse width modulation (PWM), this data complies with a quadratic function in good approximation $$X_i=a_i*Y_i+b_i*Y_i^2$$

$$Z_i=c_i*Y_i+d_i*Y_i^2 \qquad (1)$$

With PWM, the calculation in linear approximation ($b_i=d_i=0$) is sufficient, with constant supplied power, this is not the case.

A regression calculation for the coefficients $a_i$ and $b_i$ can be effected by means of the following system of equations:

$$a_i*\Sigma Y_i^4+b_i*\Sigma Y_i^3=\Sigma X_i*Y_i^2$$

$$a_i*\Sigma Y_i^3+b_i*\Sigma Y_i^2=\Sigma X_i*Y_i \qquad (2a)$$

and in analogous manner for $c_i$:

$$c_i*\Sigma Y_i^4+d_i*\Sigma Y_i^3=\Sigma Z_i*Y_i^2$$

$$c_i*\Sigma Y_i^3+d_i*\Sigma Y_i^2=\Sigma Z_i*Y_i \qquad (2b)$$

Summation can be effected via multiple current stages. The constant term in the quadratic function can be assumed to be zero because $X_i=Z_i=0$ securely applies for $Y_i=0$. The method described in the following readily allows that further approximation terms, in particular with respect to the third order and so on, can be added. Possibly, the assumption of a purely linear function for example with pulse width modulation (PWM) control is even better satisfied.

Independently of the fact if it is calculated in linear or higher approximation, the following three determination equations have to be satisfied, as for example presented in the following for n=5:

$$X_1+X_2+X_3+X_4+X_5=X_t$$

$$Y_1+Y_2+Y_3+Y_4+Y_5=Y_t$$

$$Z_1+Z_2+Z_3+Z_4+Z_5=Z_t \qquad (3)$$

In first step, a sufficiently nearly linear behavior is now assumed, that is $b_i=d_i=0$.

$$a_1*Y_1+a_2*Y_2+a_3*Y_3+a_4*Y_4+a_5*Y_5=X_t$$

$$Y_1+Y_2+Y_3+Y_4+Y_5=Y_t$$

$$c_1*Y_1+c_2*Y_2+c_3*Y_3+c_4*Y_4+c_5*Y_5=Z_t \qquad (4)$$

In vector notation:

$$a*Y = Tt \qquad (5)$$

With $$A = \begin{pmatrix} a1 & a2 & a3 & a4 & a5 \\ 1 & 1 & 1 & 1 & 1 \\ c1 & c2 & c3 & c4 & c5 \end{pmatrix} \text{ and} \qquad (5a)$$

$$Tt = (Xt/Yt/Zt)$$

The matrix A is independent of Tt, Tt and changes upon change of the target values caused by a different color temperature or a different dimming adjustment. In contrast, a changed ambient temperature is incorporated into the coefficients $a_i$ and $c_i$.

The system of equations is underdetermined and therefore not uniquely resolvable. The solution set is presently formed by a 2-dimensional plane E in a 5-dimensional parameter space of $Y_i$. On this plane, all of the points have exactly the desired color temperature and exactly the desired luminance in a linear approximation; they are located on a Planckian curve in the xy representation.

Now, it is the goal to select those points in this plane, which are "optimal" with respect to relatively freely selectable criteria. For example, they differ in their color reproduction indices.

If the best points are found on the corresponding planes for each color temperature, each dimming adjustment and each ambient temperature, thus, the corresponding conversion of the $Y_i$ into corresponding electric powers to be supplied, for example in the form of corresponding current values I and clock settings (duty cycle=DC), respectively, from the progressions of $Y_i(I)$ and $Y_i(DC)$, respectively, is effected at the very end of the method.

The description of the plane E is possible in the two-dimensional space with linear algebra. This is a considerable advantage with respect to the original situation with five parameters. The plane can be spanned by two vectors e1 and e2.

The range of the physically reasonable and achievable solutions in the 2-dimensional plane E is restricted by the conditions for the minimum luminance (Ymin(i)=0) and the maximum luminance (Ymax(i)) of each individual light source or light emitting diode. For each light source or light emitting diode, these bounding straight lines in E are in a plane parallel to each other. Intersection points of these five straight line pairs form a convex polygon, which theoretically has up to ten, but usually rather four to six, vertices.

Now, it is an aspect to examine the above mentioned polygon with respect to optimum color reproduction indices. What is assumed as the optimum, can vary according to application. This can be effected via random selection, equally sized raster surfaces, special iteration or standard gradient methods or the like.

In the following, the consideration of non-linearities is discussed.

In the spectra known heretofore, out of ten function courses $X_i(Y_i)$ and $Z_i(Y_i)$, respectively, only two were afflicted with an appreciable quadratic proportion.

Basically, the two-dimensional plane E is relatively slightly curved. The solution of the non-linear task can be numerically ascertained based on the linear solution with the aid of perturbation calculation. Basically, there are sufficiently known methods for solving non-linear systems of equations hereto. A very simple method has proven practicable.

V0 is to be a point in the plane E with $V_0 = (Y_{01}, Y_{02}, Y_{03}, Y_{04}, Y_{05})$.

The points on the plane E calculated exclusively by means of the linear terms have actual values X and Z, which are greater than desired on the condition>0 for all $b_i$ and $d_i$.

Therefore, it should provide an improved value for V if one would adapt the linear system of equations corresponding to these value differences:

$$M = \begin{pmatrix} a_1 & a_2 & a_3 & a_4 & a_5 \\ 1 & 1 & 1 & 1 & 1 \\ c_1 & c_2 & c_3 & c_4 & c_5 \\ e1_1 & e1_2 & e1_3 & e1_4 & e1_5 \\ e1_1 & e1_2 & e1_3 & e2_4 & e2_5 \end{pmatrix} \quad (7)$$

$$bk = \begin{pmatrix} Xt - \sum_{i=1}^{5} b_i * Yk_i^2 \\ Yt \\ Zt - \sum_{i=1}^{5} d_i * Yk_i^2 \\ e1 * Vk \\ e2 * Vk \end{pmatrix}$$

The correction vector $(V_{k+1}-V_k)$ is to be perpendicular to the plane E. This has the advantage that the previously calculated solution polygon can be further used for visualization because the correction vector is perpendicular thereto. The coordinate vectors e1 and e2 can further serve as a unique starting point for a non-linear solution. This can be achieved in that the system of equations (4) is supplemented with two further equations, which determine the coordinate vectors e1 and e2.

$$V_{k+1} = M^{-1} * b_k \quad (8)$$

If a difference to a predecessor value is calculated, the system of equations in principle remains unchanged, because it is linear. However, all of the constant terms (Xt, Yt, Zt, $e1*V_k$, $e2+V_k$) are cancelled at $b_k$ and only few multiplications respectively remain.

The iteration can be aborted if the function values $X_k$ and $Z_k$ sufficiently little deviate from the target values Xt and Zt, respectively. Incidentally, Yt remains unchanged anyway. It was found in tests that maximally two iterations were required with the datasets predefined by the tests to achieve a coincidence of <11 m.

$$Xk = \sum_{i=1}^{5} a_i * Yk_i + b_i * Yk_i^2 \quad (9)$$

$$Zk = \sum_{i=1}^{5} c_i * Yk_i + d_i * Yk_i^2$$

Thereby, this method has proven well suitable.

A spectral superposition light distribution once provided in this manner can be detected preferably at the lighted object by means of the light distribution sensor. With progressing operating time, light flux decreases of the individual light sources or light emitting diodes as well as also color location shifts can be observable. By means of a control loop formed by the light distribution sensor, which is preferably arranged at the object, and the lighting device, continuous tracking of the spectral superposition light distribution and thus the spectral light distribution detected at the lighted object can be automatically ascertained such that the spectral light distribution present at the object can preferably be kept substantially constant.

Further, non-limiting embodiments allow for predefining a respective spectral light distribution in application-specific manner. For this purpose, a library with spectral light distributions specified by the user can be present. The effort for the selection of a predefinable spectral light distribution can increase with increasing number of the controllable light sources. By the predefinition of certain spectral light distributions specified by the user for certain applications, which can be present in a storage unit of the lighting device or else a central control unit, the problem can be solved. Therein, the library can for example include the following fields of application:

Thus, it can be provided for artworks that specific spectral light distributions specified by the user are defined and recorded for different periods of art. Therein, it can be ascertained by experiments that different color preferences predominated or contemporary color pigments have been preferably employed in different periods of art. Thereby, spectral light distributions optimized for these pigments typically used for their period can be preadjusted, for example Renaissance, Old Masters, modern painting and/or the like.

Stored spectral light distributions specified by the user, which can particularly well reproduce artworks of certain artists, can also be provided in the library, for example spectral light distributions for artists like Michelangelo, Rembrandt, Picasso, Klee and/or the like.

Further, gentle spectral light distributions specified by the user can be provided, which can consider a damaging behavior, for example according to CIE 157:2004 and/or according to other damaging models, such as for example according to Harrison, and preferably can also be sorted according to a material property, for example gentle spectral light distributions for artworks in oil on canvas, watercolors, textiles, newspapers and/or the like.

Moreover, preadjusted optimized spectral light distributions specified by the user can be provided for various quality parameters such as for example spectra for optimized color reproduction index $R_a$(CRI), FCI, CQS and/or TM-30.

Finally, predefinitions from other fields of application, such as for example compliance with standards from the television and studio area, growth or yield spectra optimized for special plant sorts, sales-promotional lighting of food and other goods (R9, R12 optimized for meat, sausage, bakery goods, fruit, vegetable, fish, furniture, white good) and/or the like, can also be provided.

Furthermore, there is also possible to protect lighted objects. Therein, it is preferably taken into account that objects are to be protected from too much or also too little radiation in that the radiation, preferably natural and/or artificial radiation, is measured, evaluated and preferably a stress is ascertained by means of integration and extrapolation and the corresponding light sources or light emitting diodes are supplied with reduced electric power and/or an alarm signal is output to a monitoring system in case of exceedance to be expected.

The advantages and effects specified for the method analogously apply to the control device as well as to the lighting device and vice versa. Insofar, device features can also be formulated for method features and vice versa.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the illumination apparatus. In the following description, various aspects are described with reference to the following drawings, in which.

DETAILED DESCRIPTION

Figure 1:
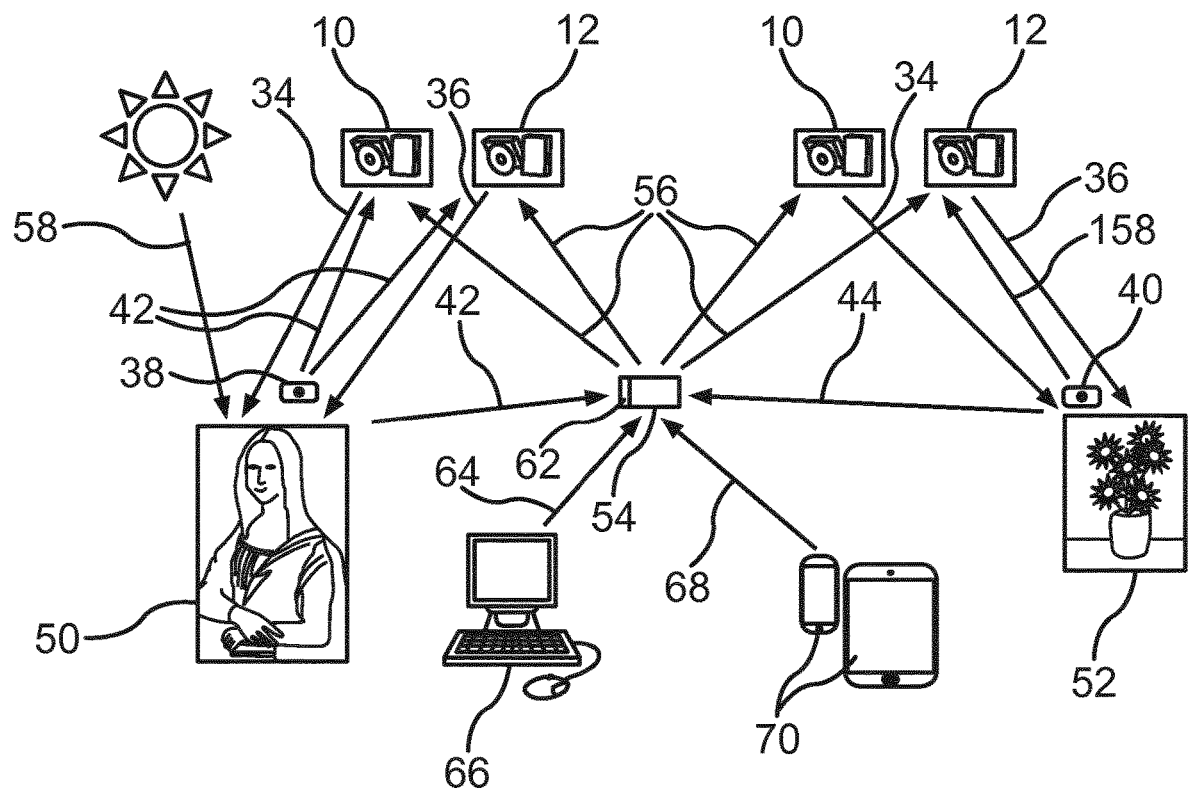
FIG. 1 is a schematic representation a system overview with objects, which are lighted by lighting devices, wherein light distribution sensors are arranged at the objects and are in communication link with a control device, which in turn is in communication link with the respective lighting devices and the ballasts thereof, respectively.

In FIG. 1, a system overview is shown in a schematic representation, in which a picture is lighted as an object 50 in a left area. In a right area, a group 52 of objects, represented by a picture, is lighted. The object 50 and the group 52 of objects, respectively, is presently respectively lighted by a lighting device 10 and a group 12 of lighting devices, wherein in the group 12 of lighting devices, each of the lighting devices can be formed by a lighting device like the lighting device 10.

The lighting device 10 outputs light 34, which serves for lighting the object 50 and the group 52 of objects, respectively. Correspondingly, each group 12 of lighting devices outputs light 36, which additionally also serves for lighting the object 50 and the group 52 of objects, respectively. In addition, the object 50 is also lighted by ambient light 58, which is presently provided by the sun not labeled.

Figure 2:
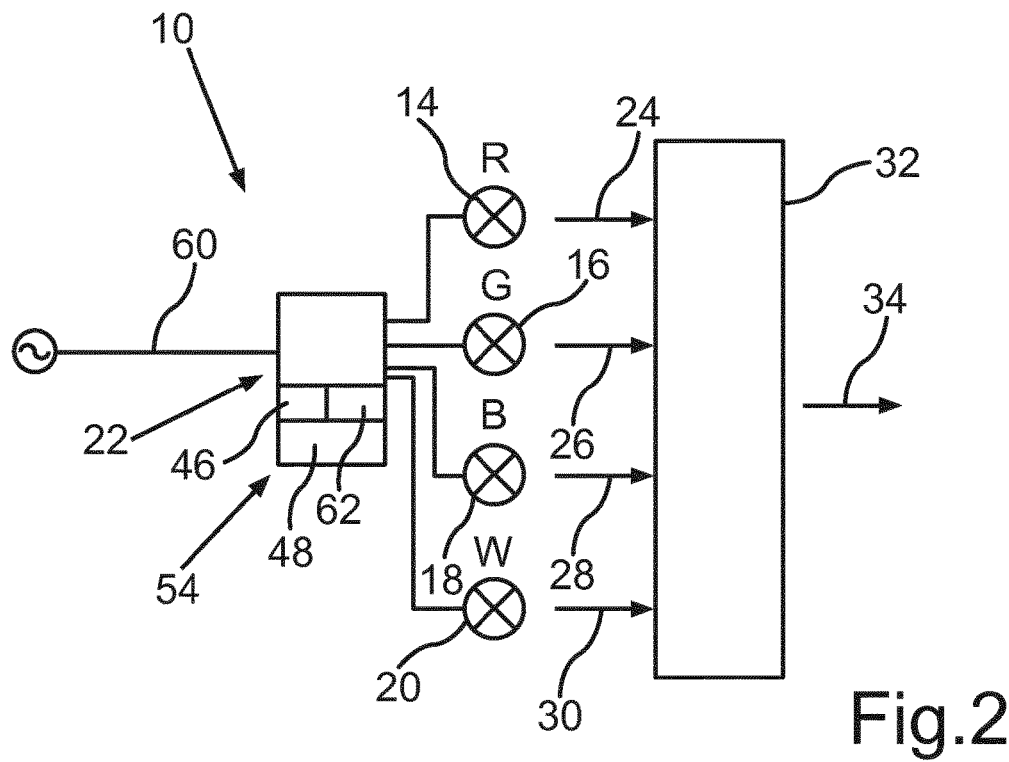
FIG. 2 is a schematic block diagram of one of the lighting devices according to FIG. 1.

FIG. 2 exemplarily shows one of the above mentioned lighting devices 10 in a schematic block diagram. In the present embodiment, the lighting device 10 comprises four light sources 14, 16, 18, 20, which emit respective source light 24, 26, 28, 30 due to supply with electric power.

For this purpose, the light sources 14, 16, 18, 20 are each individually connected to a ballast 22, by means of which the respective corresponding electric power can be supplied. Thereby, a respective light flux of the light sources 14, 16, 18, 20 can be adjusted depending on the respectively supplied electric power. Presently, the light sources 14, 16, 18, 20 can be adjusted substantially independently of each other with respect to their light emission.

The light sources 14, 16, 18, 20 output their respective source light 24, 26, 28, 30 with spectral light distributions different from each other. Thus, the light source 14 emits substantially red light, the light source 16 emits substantially green light, the light source 18 emits substantially blue light as well as the light source 20 emits substantially white light. The spectral light distributions are corresponding. The light sources 14, 16, 18, 20 are presently formed by corresponding light emitting diodes.

The source light 24, 26, 28, 30 emitted by the light sources 14, 16, 18, 20 is superimposed by means of an optical unit 32 of the lighting device 10 such that the lighting device 10 outputs the light 34 and the group 12 of lighting devices outputs the light 36, respectively, with a respective spectral superposition light distribution.

The spectral superposition light distribution results from a superposition of the spectral light distributions, which are provided by the source light of the respective light sources 14, 16, 18, 20. The optical unit 32 is presently not further specified. It comprises corresponding suitable optically effective elements like lenses, mirrors, prisms and/or the like to superimpose the respective source light 24, 26, 28, 30 to the respective light 34, 36. Presently, the optical unit 32 further provides a light exit opening for the light 34, which also represents a light exit opening of the lighting device 10 at the same time.

Besides a control unit not further designated, the ballast 22 of the lighting device 10 further includes an evaluation unit 46 as well as a database in the manner of a library 48, in which a plurality of spectral light distributions specified by a user are stored in a storage unit. The above mentioned units are further explained in the following. Moreover, the ballast 22 is connected to an electrical energy supply not further illustrated via an energy supply line 60, via which it is supplied with electrical energy for the intended operation.

From FIG. 1, it is further apparent that a light distribution sensor 38 is arranged in the area of the object 50, here immediately at the object 50. The light distribution sensor 38 serves for detecting the light, which lights the object 50. Besides the light 34, 36, this also includes the ambient light 58. The light distribution sensor 38 thus detects a summary light action from ambient light 58 as well as the light 34, 36 of the lighting devices 10 and the group 12 of lighting devices, respectively.

The light distribution sensor 38 provides a sensor signal 42 corresponding to a spectral light distribution of the light detected by it. Thus, the light distribution sensor 38 is presently arranged distant from the lighting device 10 and the group 12 of lighting devices, respectively. Therefore, it is in communication with the lighting devices 10 and the group 12 of lighting devices, respectively, via a suitable radio link such that the sensor signal 42 can be communicated to the lighting device 10 and to the group 12 of lighting devices, respectively.

Presently, the light distribution sensor 38 comprises an own energy supply unit not illustrated, which allows obtaining electric energy for the intended operation of the light distribution sensor 38 from the detected light at the same time. Thus, in this configuration, the light distribution sensor 38 does not need an external energy supply. In contrast, in other configurations, it can be provided that the light distribution sensor 38 comprises an own electric energy storage like an accumulator, a battery or the like to be able to provide electric energy for the intended operation. Moreover, there is of course also the possibility of connecting the light distribution sensor 38 to an energy supply network, for example to the energy supply network 60, to which the ballast 22 is also connected.

From FIG. 2, it is apparent that the ballast 22 includes a control device 54, which includes both the evaluation unit 46 and the library 48. Moreover, the control device 54 includes a communication unit 62, which is formed to receive and evaluate the sensor signal 42 emitted by the light distribution sensor 38 via radio. For this purpose, the evaluation unit 46 includes a comparison unit not further illustrated, which ascertains a detected light distribution from the sensor signal 42 and compares it to a predefined spectral light distribution, which is ascertained from one of the spectral light distributions specified by the user as will be explained in the following. Depending on the comparison, a control signal for the ballast 22 is provided, which serves to be able to adjust the electric power supplied to the respective light sources 14, 16, 18, 20. Thereby, it is possible to also be able to adjust the spectral superposition light distribution of the light 34 and 36, respectively.

The light distribution sensor 38 is formed to ascertain the spectral light distribution of the detected light. For this purpose, the light distribution sensor 38 can include one or more photodetectors, for example photodiodes or the like, which are preferably sensitive to different predefined ranges of the light spectrum. Corresponding to the detected light distribution and preferably considering the detected light flux, the sensor signal 42 is provided.

In the right area of FIG. 1, a corresponding representation for the group 52 of objects is provided. Corresponding to the group 52 of objects, a group 40 of light distribution sensors is also provided, wherein each one of the light distribution sensors of the group 40 is preferably arranged in the area of one of the objects of the group 52 of objects. Each of the light distribution sensors of the group 40 corresponds to the light distribution sensor 38 with respect to its functionality. The group 40 of the light distribution sensors is in communication link with each other—not further illustrated. The spectral light distributions correspondingly detected by the group 40 of the light distribution sensors, are communicated via a communication link 158, which is presently also a radio link, as previously described, to the lighting device 10 and the group 12 of lighting devices, respectively. Correspondingly, the lighting is adjusted and controlled by light output of the light 34 and 36, respectively. The further details correspond to what was already previously explained.

In FIG. 1, the control device 54 is represented as a separate unit separated from the light distribution sensors 38 and the group 40 of the light distribution sensors, respectively, and the lighting device 10 and the group 12 of the lighting devices, respectively. However, the control device 54 can be arranged at least partially integrated in one of the above mentioned units or devices. From FIG. 1, it is further apparent that the control device 54 is immediately in communication link with the light distribution sensor 38 as well as the group 40 of light distribution sensors. In this case, an immediate communication link with the lighting device 10 and the group 12 of lighting devices, respectively, does not have to exist from the light distribution sensor 38 and the group 40 of light distribution sensors, respectively. The lighting device 10 and the group 12 of lighting devices, respectively immediately obtain their respective control signals as control signals 56 from the control device 54. If the control device 54 is arranged spatially separated from the lighting device 10 and the group 12 of lighting devices, the communication link with the control device 54 can also be a radio-based communication link, via which the respective control signal 56 can be communicated. In non-limiting embodiments, the communication link is bidirectional such that control signals cannot only be communicated from the control device 54 to the lighting device 10 and the group 12 of lighting devices, respectively, but data can conversely also be communicated from the lighting device 10 and the group 12 of lighting devices, respectively, to the control device 54, for example parameters with respect to a functionality, malfunction messages, operating state messages and/or the like.

Further, the control device 54 is formed to enter in communication link with a programming appliance 66 via a presently also wireless communication link 64. Presently, the programming appliance 66 is formed by a portable computer unit, for example a laptop or the like. Presently, the communication link 64 is based on short-range radio, for example based on a WLAN standard or the like. Alternatively, an ultrasonic-based communication link or an infrared-based communication link can also be provided here. The control device 54 can be adequately programmed by the programming appliance 66. In particular, the predefined spectral light distribution can be adjusted or one of the spectral light distributions specified by the user can be selected from the library 48. Moreover, a series of further parameters can also be adjusted, for example a dependency of the predefined spectral light distribution on an ambient temperature, which can be detected by means of a non-illustrated temperature sensor, and/or the like.

Moreover, the control device 54 is formed to enter into communication link with communication terminals 70, such as for example a smart phone or the like, via a further communication link 68. Here too, the communication link 68 can be formed by a short-range radio link or the like. For example, user-specific parameters can be adequately adjusted by the communication terminal 70, for example in that a user is able to communicate a desired light intensity to the control device 54, such that the lighting device 10 and the group 12 of lighting devices, respectively, output their light 34, 36 such that the desired lighting effect of the object 50 and the group 52 of objects, respectively, can be achieved. Thus, the user can for example adjust different lighting scenarios to be able to view the object in different lighting scenarios. For example, it can be provided that the user adjusts a lighting as by daylight at midday in a first adjustment, whereas he can be capable of adjusting a lighting by daylight as at dusk or at dawn in a second adjustment. Thereby, high user friendliness in particular with respect to the lighting of the object 50 and the group 52 of objects, respectively, can be achieved.

In the following, an adjustment of the lighting device 10, as it has been explained based on FIG. 1, is to be further detailed based on the flow diagram illustrated in FIG. 3. The method begins in step 72, which represents the start of the method. From the start position in step 72, the procedure is continued with a step 76. In step 76, the control device 54 receives the sensor signal 42 and 44, respectively, of the light distribution sensor 38 and the group 40 of light distribution sensors, respectively, the sensor signal 42 and 44, respectively, of which corresponds to a spectral light distribution of the respective detected light of the light distribution sensor 38 and the group 40 of light distribution sensors, respectively.

In a next step 78, it is examined if an amount of a difference of the detected spectral light distribution to a predefined spectral light distribution is less than a predefined minimum value. If the amount of the difference is less, this is denoted by y, a branch to step 90 is effected, which defines the end of the adjustment. The procedure is terminated at this place.

In contrast, if the difference is greater, a branch is effected, which is denoted by n. The method is then continued with step 80 in the following.

In step 80, an individual channel calibration for each of the light sources 14, 16, 18, 20 is executed as it will be further detailed in the following based on FIG. 8. Presently, it is provided that a predefined number of x %—steps is performed for the light sources 14, 16, 18, 20. In the following, this is denoted by $S_{i(x)}$, wherein the index i stands for the respective one of the light sources 14, 16, 18, 20. x indicates the percentage.

Then, the method is continued in a step 82. In step 82, calculation of electric parameters is effected, which serve to associate corresponding powers, which are supplied from the ballast 22 to the respective light sources 14, 16, 18, 20 as the electric power, corresponding to the previously ascertained light fluxes $S_{i(x)}$. The respective electric powers are denoted by $P_{i(I)}$ in the following.

In the following step 84, the electric parameters $P_{i(I)}$ are sorted in descending order of their contribution to the entire spectral light distribution. Hereby, an order results, according to which the light sources 14, 16, 18, 20 are adjusted in the further course. This first relates to the light sources, which output white light, thus here the light source 20.

In the next step 86, the non-white or colored light sources are adjusted. This presently relates to the light sources 14, 16, 18. In this step, sorting of the corresponding electric parameters in descending order from a large wavelength λ to smaller values of λ is effected. Thus, an order of $P_{R(I)} \ldots P_{G(I)} \ldots P_{B(I)}$ for example results, wherein R stands for red, G for green and B for blue.

In the following step 88, the powers to be supplied to the light sources 14, 16, 18, 20 are adjusted according to the electric parameters, as they were previously ascertained. Hereafter, the method jumps to an insertion point 74 and the method is continued with step 76.

Therein, the procedure is repeated until it is determined in step 78 that the amount of the difference falls below the tolerance or the minimum value.

Figure 4:
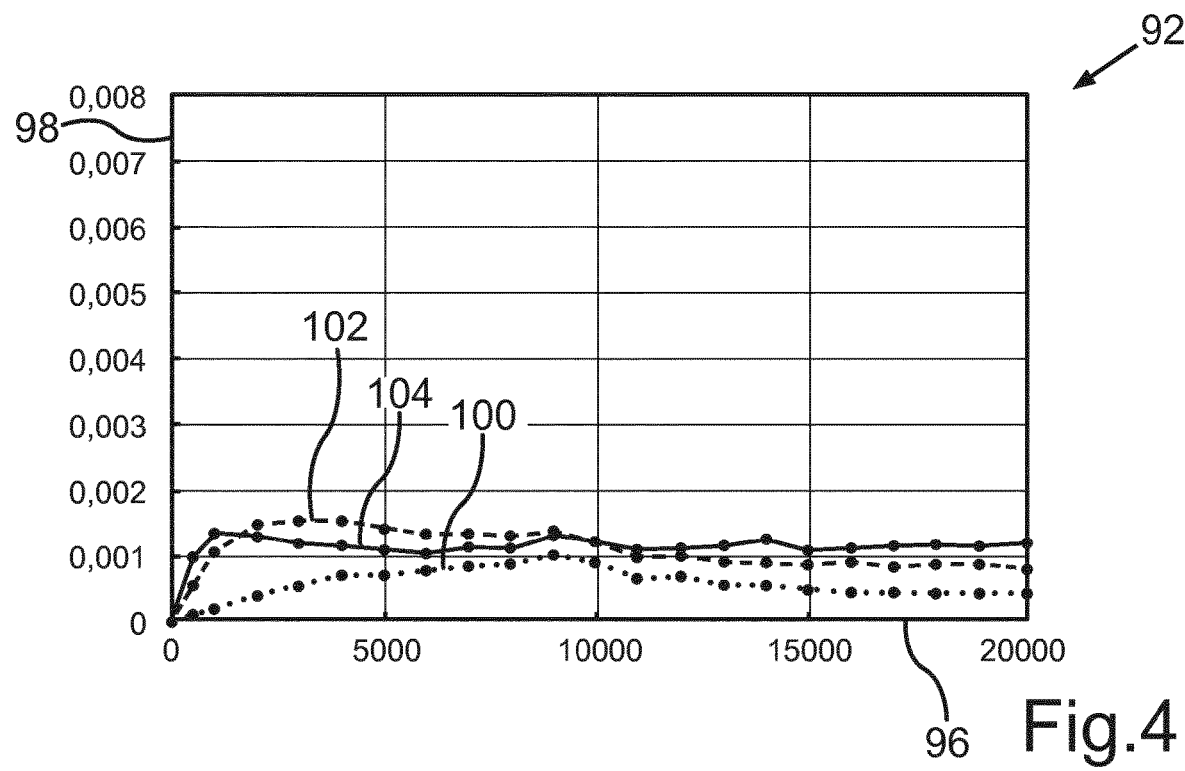
FIG. 4 is a schematic representation a diagram, in which by means of three graphs a respective chromaticity shift of a light emitting diode depending on the operating time is represented by means of three graphs respectively associated with a temperature.
Figure 5:
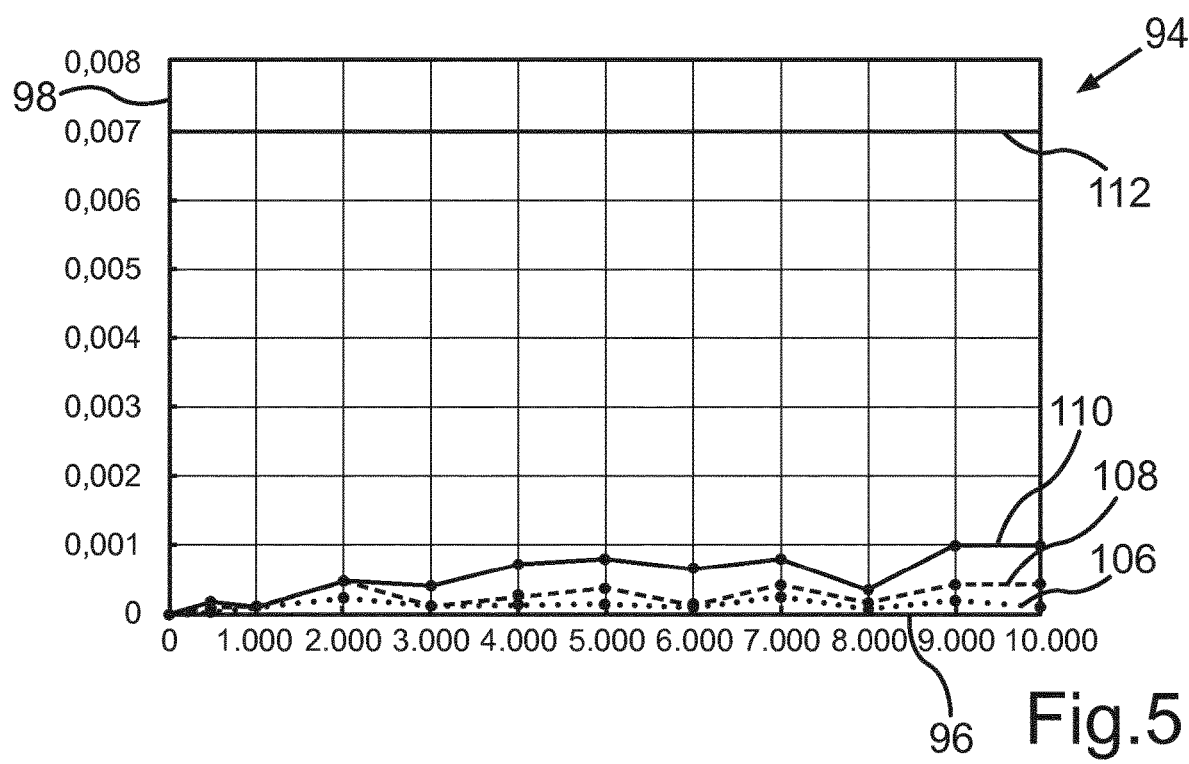
FIG. 5 is a schematic representation of a diagram as FIG. 4, but for a further light source, which is different from the preceding light source according to FIG. 4 with respect to the spectral light distribution of the source light output by the light source.

With FIGS. 4 and 5, two schematic diagrams 92, 94 are illustrated, by which a color location shift depending on a temperature and an operating time of two different light sources, presently two different light emitting diodes, is represented. In the diagrams, the abscissa 96 denotes a time axis, on which the time in hours is indicated. Ordinates 98 of the diagrams 92, 94 indicate a relative color deviation.

In FIG. 4, a color location shift depending on the operating time of the light emitting diode at a temperature of 55° C. is indicated with a graph 100 in the diagram 92. With a graph 102, a dependency on the operating time at a temperature of 85° C. is represented. Correspondingly, a graph 104 represents the dependency on the operating time at a temperature of 118° C. It is apparent that a relative color deviation slowly increases with increasing operating time at the temperature von 55° C. The further graphs 102 and 104 show that the higher the temperature is, the relative color deviation considerably faster increases and also predominates in its magnitude as it is apparent based on the graphs 102 and 104. Presently, this is represented for a red light emitting diode.

FIG. 5 shows comparable conditions for a blue light emitting diode. The dependency over the operating time at a temperature of 55° C. is again represented by a graph 106, whereas the graph 108 represents a dependency on the operating time at a temperature of 85° C. and the graph 110 represents the dependency on the operating time at a temperature of 115° C. It is apparent that the relative color location shift is considerably less with respect to the red light emitting diode according to FIG. 4, namely also with increasing operating time. In FIG. 5, a limit value is represented by the straight line 112, which is predefined by an Energy Star standard.

This demonstrates how variations of the spectral superposition light distribution of the light 34, 36 output by the lighting device 10 and the group 12 of lighting devices, respectively, occur with increasing operating time of the lighting device 10 and the group 12 of lighting devices, respectively. Non-limiting embodiments address this problem and counteracts this development by a feedback in the manner of a control such that the impacts of variations of the spectral superposition light distribution can be overall considerably reduced, if not even completely prevented, over the entire operating time of the lighting device 10 and the group 12 of lighting devices, respectively.

Figure 6:
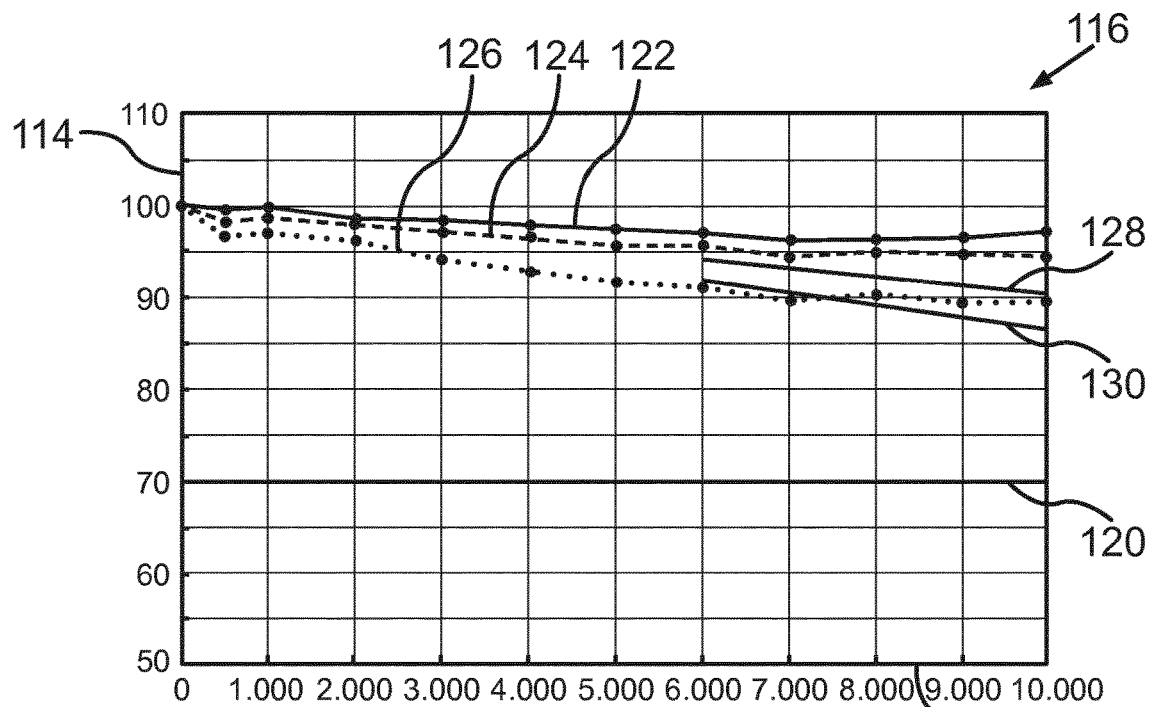
FIG. 6 is a schematic representation of a diagram, in which a light flux change depending on the time and the temperature is represented for the first light source.
Figure 7:
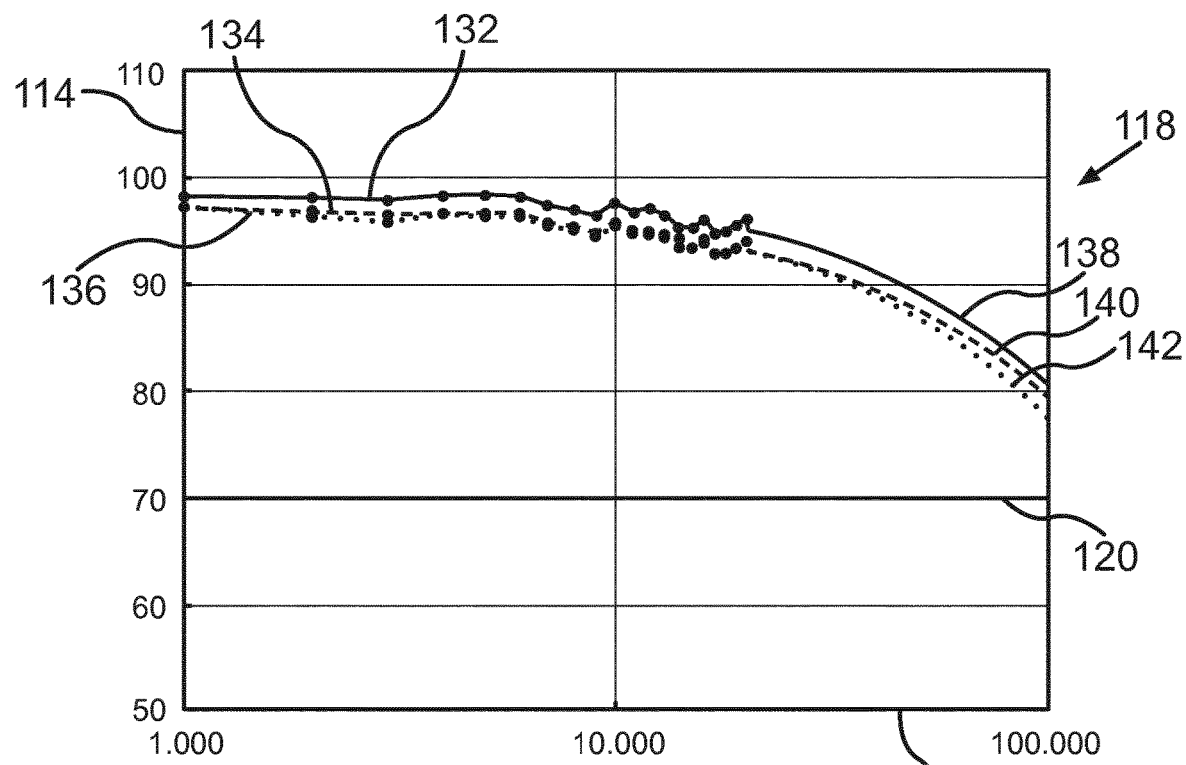
FIG. 7 is a schematic representation as FIG. 6, in which the dependency for the second light source according to FIG. 5 is represented.

With diagrams 116, 118 in FIGS. 6 and 7, a corresponding variation of the relative light flux of the light emitting diodes, as they were already taken as a basis for the discussion to FIGS. 4 and 5, is represented. A respective abscissa 96 again denotes the time, which is indicated in hours on the respective abscissas. A respective ordinate 114 in the diagrams 116, 118 denotes a relative variation of the light flux in percent.

From the diagram 116 of FIG. 6, which is associated with the red light emitting diode, which was already explained according to the diagram 92 according to FIG. 4, the relative variation of the light flux over the operating time of the light emitting diode at a temperature of 55° C. is represented with a graph 122. With a graph 124, the same variation is represented for a temperature of 85° C. and the corresponding variation at a temperature of 115° C. is represented with a graph 126. It is apparent that a relative decrease of the light flux is not only effected with increasing operating time of the light emitting diode, but moreover is also dependent on the temperature. Thus, the relative decrease of the light flux additionally increases with increasing temperature. Limit values are indicated with the graphs 128 and 130, which result from the Energy Star standard, namely with the graph 128 for an operating time of up to 35,000 hours, and with the graph 130 for an operating time of up to 25,000 hours. A limit value is represented with a straight line 120, which is not to be undershot by a light flux of the light emitting diode.

FIG. 7 shows a corresponding diagram as FIG. 6, but wherein here the abscissa 96 representing the time axis includes a greater time scale due to the considerably higher operating stability of the blue light emitting diode with respect to the red light emitting diode according to FIG. 6, wherefore it is presently logarithmically configured. Here too, a limit value is represented with a straight line 120, which is not to be undershot by a light flux of the light emitting diode. The dependency of the relative light flux on the operating time at a temperature of 55° C. is represented with a graph 132. Correspondingly, the graphs 134 and 136, respectively, represent the conditions at a temperature of 85° C. and 118° C., respectively. With the graphs 138, 140 and 142, extrapolated developments are represented. Therein, the graph 138 is associated with an operating temperature of 55° C., the graph 140 is associated with an operating temperature of 85° C. and the graph 142 is associated with an operating temperature of 118° C.

From the diagram 118 according to FIG. 7, it is apparent that the relative variations of the light flux depending on the operating time and the temperature are considerably lower in the time scale as it is represented in the diagram 116 of FIG. 6. Thereby, the lower influence on the variation of the spectral superposition light distribution of the lighting device 10 and the group 12 of lighting devices, respectively, also explains.

Figure 3:
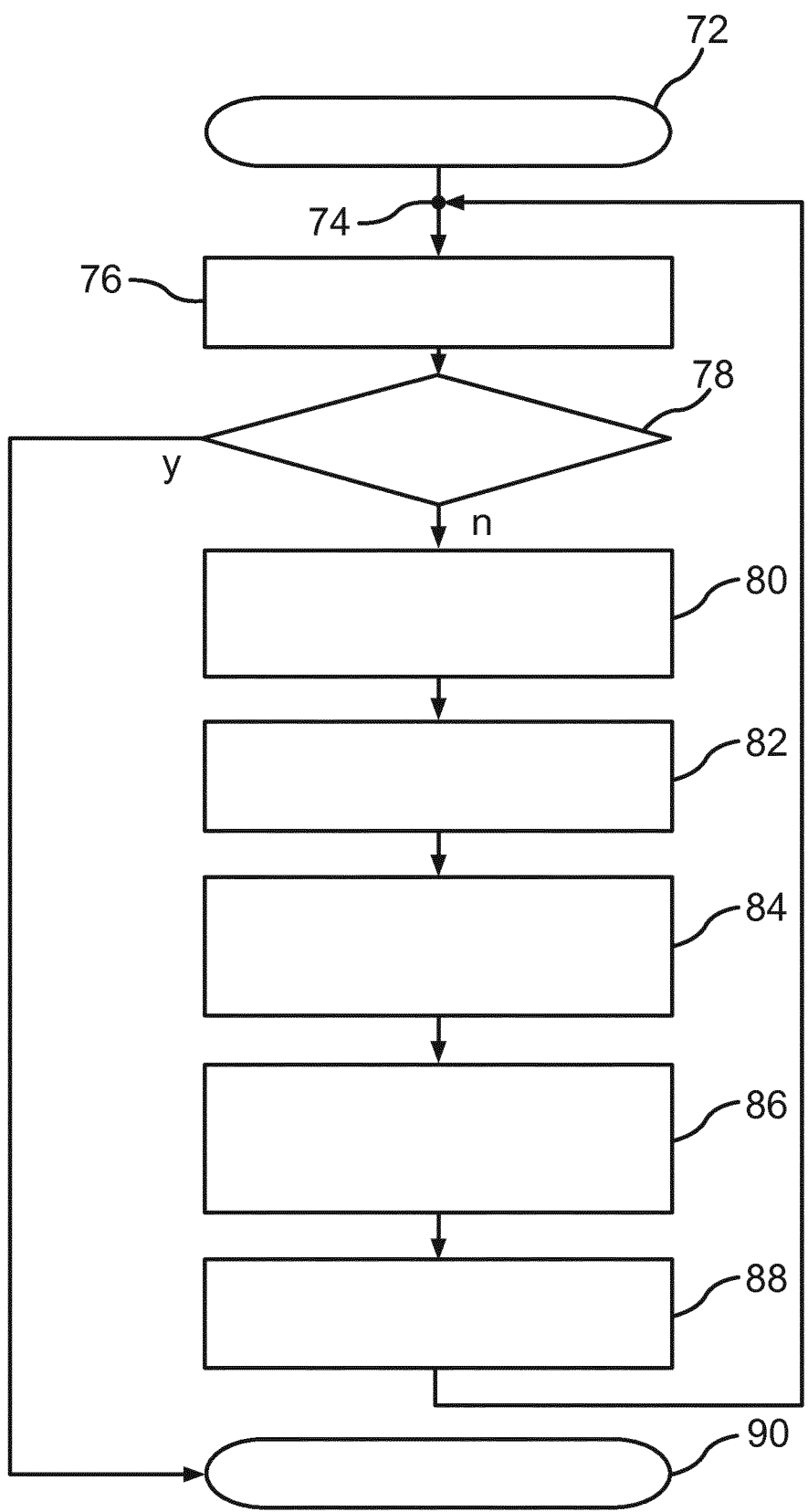
FIG. 3 is a schematic representation a flow diagram for performing a method for controlling a spectral superposition light distribution of light output by the lighting device.
Figure 8:
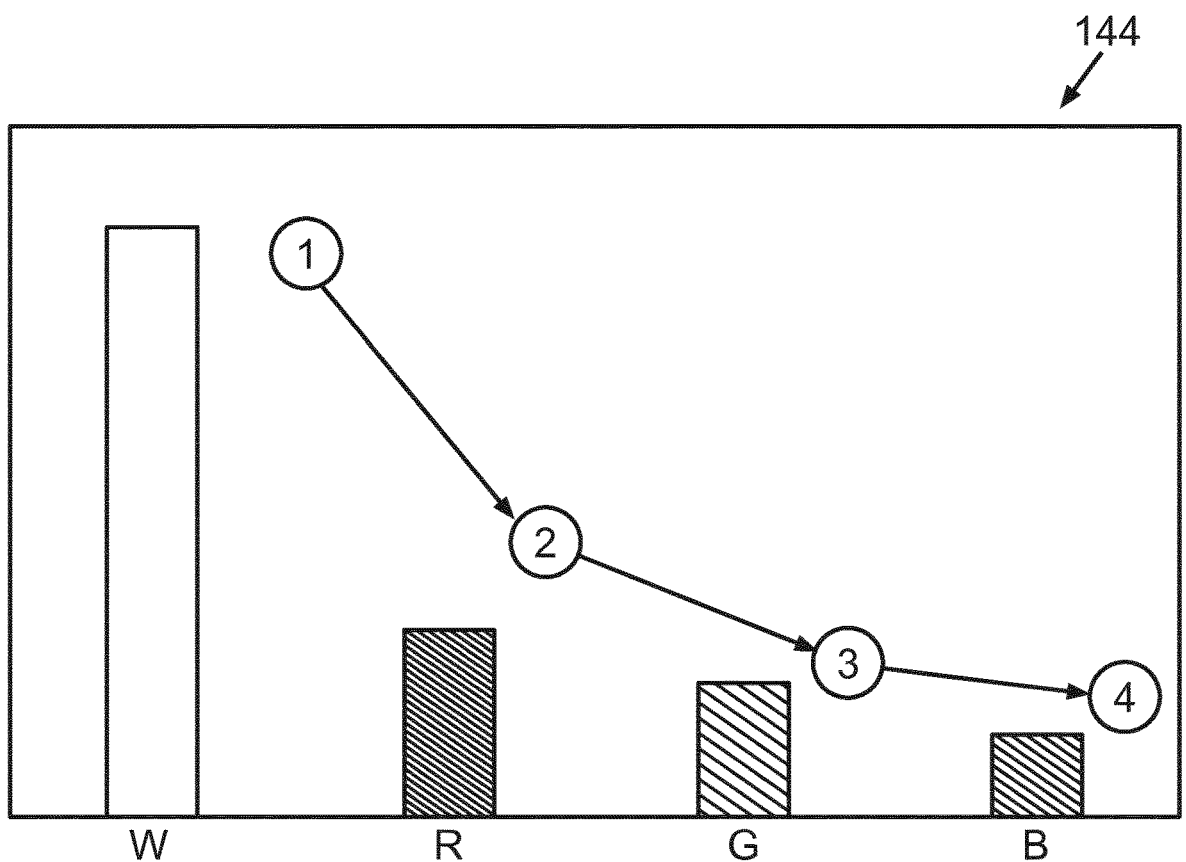
FIG. 8 is a schematic bar diagram representation for visualizing a correction strategy for the adjustment of the light sources according to the flow diagram according to FIG. 2.

FIG. 8 shows in a schematic bar diagram 144, how the adjustment according to the flow diagram of FIG. 3 practically operates. It is apparent that a proportion in the light flux of the white light source 20 is represented by the bar 1, whereas a bar for a light flux proportion of the red light source 14 is denoted by 2, a bar for a light flux proportion of the green light source 16 is denoted by 3 and a bar for a light flux proportion of the blue light source 18 is denoted by 4. From it, the order of the adjustment of the light sources 20, 14, 16, 18 in this order also results at the same time.

Figure 9:
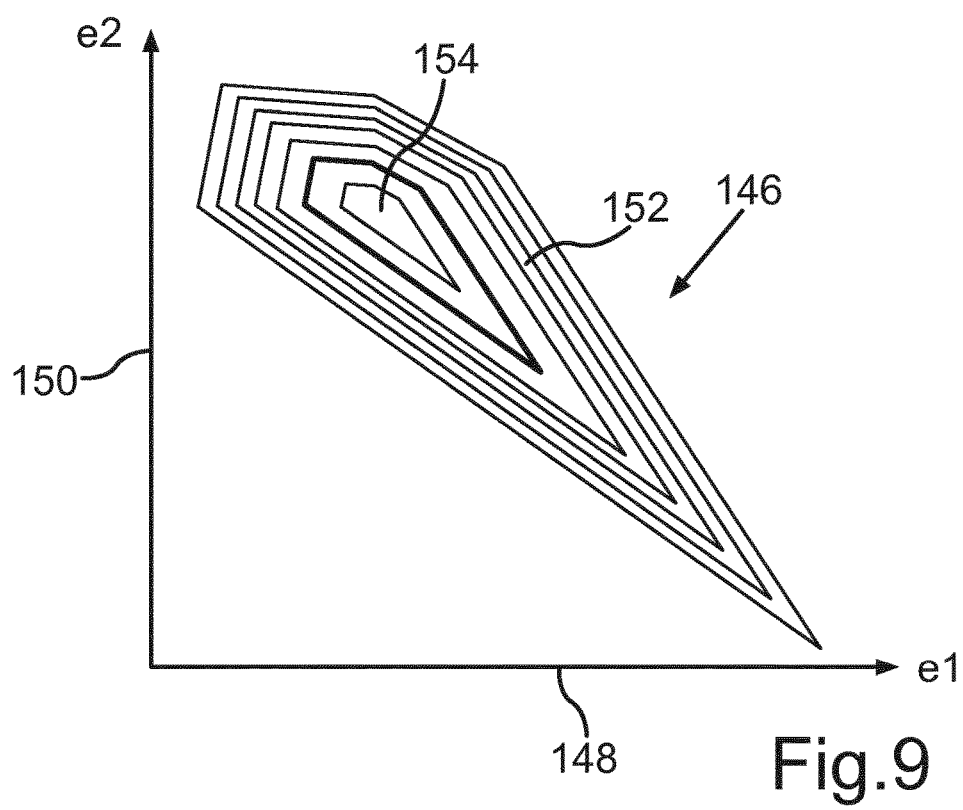
FIG. 9 is a schematic diagram representation for representing a typical criterion for S.

FIG. 9 shows a further schematic diagram 146, which represents the application of the algorithm. An abscissa 148 is associated with a coordinate vector e1, whereas an ordinate 150 is associated with a coordinate vector e2.

For example, if one selects $$S = \sum_{k=1}^{n} (100 - Ri)^2 \qquad (6)$$

as the quality criterion, a typical progression manifests for S, as it is represented for a good color reproduction by the graph 154 and for a poor color reproduction by the graph 152. The crest-like profile of this quality criterion is presently characterized in that a severe gradient in S can be observed transversely to the crest, while it is weak longitudinally to the crest. Thereby, the ascertainment of an absolute best value can possibly not be unique such that further criteria are required for the determination of the final operating point, for example a proximity to operating points with a similar color temperature or the like.

Presently, it manifests that S is substantially dependent on a proportion, which describes cold white light and shows a very flat behavior with respect to the other degree of freedom in the plane. The progression of S is smooth. This simplifies finding any optimum with respect to this criterion, but wherein further criteria are also required to localize the location of the optimum in reproducible manner.

The system construction according to FIG. 1 further includes that the lighting device 10 and the group 12 of the lighting devices, respectively, is oriented with respect to the respective object 50 and the group 52 of objects, respectively, such that they are covered or lighted by the light 34, 36 respectively output by the lighting device 10 and the group 12 of lighting devices, respectively. In the present configurations, it is in particular to be noted that not only the light 34 and 36, respectively, is detected, but also further light, which is output by the environment and contributes to the lighting of the object 50 and the group 52 of objects, respectively, by the light distribution sensor 38 and the group 40 of light distribution sensors, respectively. This is indicated by the ambient light 58 in FIG. 1. The ambient light 58 can include both natural radiation such as daylight, which for example enters through a window, and artificial lighting, for example by foreign lighting devices. Therein, the light distribution sensor 38 and the group 40 of light distribution sensors, respectively, detect the light impinging on the object 50 and the group 52 of objects, respectively, with its entire spectral distribution as a sum, namely preferably in the spectral sensitivity range of the light distribution sensor 38 and the group 40 of light distribution sensors, respectively, thus for example in the visible light range, in the UV range and preferably also in the IR range. In addition, the respective illuminance can in particular also be detected, for example considering the V(λ) curve defined for the human eye, or according to other evaluation functions for calculating defined parameters, for example with respect to the plant growth or the like.

By the overall system represented in FIG. 1, a closed loop circuit can be provided. The communication links can be effected by means of wired communication links, for example based on an USB interface protocol, Ethernet or the like, or also based on a wireless communication link, such as for example radio, WLAN, ZigBee, Bluetooth or other suitable communication protocols, such as for example based on infrared, visible light like LiFi or the like.

The light distribution sensor 38 and the group 40 of light distribution sensors, respectively, can be supplied with electric energy by a wired communication channel or also in battery-assisted manner. Moreover, there is also the possibility of utilizing temperature fluctuations and/or solar cells to generate electric energy, or the like. The communication is preferably effected until the desired spectral light distribution has been achieved with sufficient accuracy.

Therein, for analysis in operation monitoring described in the following, in a further step, evaluation analyses such as for example color location, color reproduction, color temperature, distance from the Planckian locus and/or other quality features as well as for example illuminance and the extrapolated annual dose can be ascertained and/or calculated. Therein, it can be advantageous if the light distribution sensor is arranged immediately at the object and detects all of the radiation impinging on the object. In non-limiting embodiments, all of the values are stored and can be readable upon later communicative coupling to an evaluation system.

If multiple lighting devices are combined to a lamp group, the individual lighting devices can be individually calibrated to be able to uniquely associate a light source in an ascertained spectrum. Therein, it can be advantageous if natural daylight is not present on the one hand, whereby the measurement can preferably be performed at night, in particular in time-controlled manner, and only the lighting device to be calibrated is in operation on the other hand. All of the lighting devices associated with the group can then be calibrated one after the other.

A determination of comparative values, in particular the minimum value, as well as also operating states, can be wirelessly performed by means of suitable control signals by the programming appliance 66 and/or also by communication terminals 70. Therein, the consideration can take into account the compliance with target values, which consider the current spectral light distribution of the lighting devices at the measurement point of time or which are extrapolated in a selectable operating mode based on operating hours into the future, the integrated spectral light distribution over a period of time.

As previously explained, a set value in the form of a predefined spectral light distribution or in the form of quality parameters can be described (CRI, CQS, TM-30, (x;y), (u;v), spectral distribution, color temperature $T_F$ and/or the like). The control device 54, which can also be part of the light distribution sensor 38 in a particular characteristic, ascertains a deviation from the set value and calculates the correction values based on the above described procedure from the found deviation.

The light distribution sensor 38 transmits the sensor signal 42, 44 with respect to the manipulated parameters influencable in the lighting device 10, for example dimming channels R, G, B, A, WW, CW, to the associated lighting device 10. It processes the sensor signal 42, 44 and adapts its spectral superposition light distribution based on the new values for the different dimming channels. The cycle with respect to the set value—actual value comparison with corresponding communications for correction repeats until the desired result is achieved and the deviation from the set value is below the previously determined threshold value or the minimum value. A sufficiently low deviation from the set value can be satisfied if the color location of the detected spectral light distribution is within n McAdam ellipses around the color location of the set spectrum or the sum of individual deviations of set and actual spectrum assumes a minimum. In case of failure, a message can be output to a central control unit or also to the programming appliance 66 or the communication terminals 70.

The calibration and operation monitoring, respectively, can preferably be performed permanently or also in suitable time intervals for first configuration, for example daily, weekly, monthly and/or freely configurable.

With respect to the predefinable spectral light distribution, a suitable spectral light distribution can be selected from the library 48, in particular if calculated spectral light distributions are not present, which preferably includes predefined spectral light distributions correspondingly suitable for the application, which are there retrievably stored. The library 48 can be extended by calculated spectral light distributions, for example by means of the programming appliance 66 or also the communication terminals 70.

In non-limiting embodiments, at least two controls can basically be performed, namely firstly the control of a radiation quality. The permanent correction of possible deviations from the detected spectral light distribution of the lighting device to the set spectrum can be adapted to a desired pattern. Moreover, the radiation quantity can secondly be controlled. The compliance with lighting predefinitions can be realized upon exceeding or falling below threshold values. The illuminance can be controlled to a desired value. Therein, it can be continuously readjusted and maintenance works by color location variations or light flux deviations can be reduced or are no longer required.

With respect to the radiation quantity, for the protection of lighted objects, an annual dose predicted based on utilization profiles can be used for preserving artworks in museums or galleries. Herein, user profiles can be calculated, namely based on turn-on durations of the lighting device 10. With the measured spectral light distribution at the object and the user profiles, it can be calculated, which annual dose would load the object with unchanged adjustment. In case of threshold value exceedance, measures can be derived from it by means of the control device 54, such as for example dimming the lighting device 10 and the light sources 14, 16, 18, 20 thereof, respectively, or also turning off the associated lighting device 10 and group 12 of lighting devices, respectively. Optionally, alarm signals can be configured such that warning messages can be output to preconfigured receivers or mobile communication terminals upon exceedance or shortfall. Shortfalls can be critical if the lighting is for example employed for growth promotion of organisms, for example plants, algal or the like. Herein, both compliance with the radiation quantity and the radiation quality, such as for example maintenance of growth promoting spectral light distributions, are advantageous. Further fields of application are compliance with certain industry standards, such as for example an illuminance in a museum conservation, compliance with the TLCI standard in the movie and television industry and/or the like.

Moreover, the light distribution sensors can additionally also be used to for example be able to detect a presence of persons and thus to reduce the artificial lighting upon absence of persons to protect sensitive objects on the one hand, or to ascertain, which objects get the greatest interest of persons on the other hand.

Finally, there is also the possibility that the light distribution sensors contain so-called beacons. They can communicate information to mobile communication terminals, which are in the range of the objects. This information can include information with respect to the respective object or also provide information, which provide more in-depth further information to the object in an intranet or in the Internet. In an example, it is conceivable that a viewer standing in front of a picture obtains audio or video files, which for example relate to an artist, relate to the picture content, in particular with respect to the origination, or further information associated therewith.

In non-limiting embodiments, the automated adjustment of the predefined spectral light distributions and monitoring or maintaining them constant over time for the purpose of the maintenance of lighting equipments with multiple, variable light generating circuits, the aging characteristics of which differ from each other. A further advantage is the protection of sensitive objects by dimming or turning off upon too high loads and alerting the monitoring systems. Maintenance works for lighting devices with high demand to the light quality or light quantity can be reduced or even be omitted.

LIST OF REFERENCE CHARACTERS 1 bar
2 bar 3 bar
4 bar
10 lighting device
12 group of lighting devices
14 red light source
16 green light source
18 blue light source
20 white light source
22 ballast
24 source light
26 source light
28 source light
30 source light
32 optical unit
34 light
36 light
38 light distribution sensor
40 group of light distribution sensors
42 sensor signal
44 sensor signal
46 evaluation unit
48 library
50 object
52 group of objects
54 control device
56 control signal
58 ambient light
60 energy supply line
62 communication unit
64 communication link
66 programming appliance
68 communication link
70 communication terminal
72 step
74 insertion point
76 step
78 step
80 step
82 step
84 step
86 step
88 step
90 step
92 diagram
94 diagram
96 abscissa
98 ordinate
100 graph
102 graph
104 graph
106 graph
108 graph
110 graph
112 straight line
114 ordinate
116 diagram
118 diagram
120 straight line
122 graph
124 graph
126 graph
128 graph
130 graph
132 graph
134 graph
136 graph
138 graph
140 graph
142 graph
144 bar diagram
146 diagram
148 abscissa
150 ordinate
152 graph
154 graph
158 communication link

The invention claimed is:

1. A method for controlling a lighting device comprising at least two electric light sources, wherein the method comprises:
supplying a first electric power to a first light source of the at least two light sources by at least one ballast in order for the first light source of the at least two light sources to emit a first source light with a first spectral light distribution;
supplying a second electric power to a second light source of the at least two light sources by the at least one ballast in order for the second light source of the at least two light sources to emit a second source light with a second spectral light distribution different from the first spectral light distribution;
superimposing the first source light and the second source light from the at least two light sources by an optical unit of the lighting device such that the lighting device outputs light with a spectral superposition light distribution;
detecting at least the light outputted by the lighting device by a light distribution sensor that provides a sensor signal corresponding to a spectral light distribution of the detected light;
comparing the sensor signal to a predefined spectral light distribution;
ascertaining a respective proportion of at least a first light source and a second light source of the at least two light sources in a light flux of the light output by the lighting device; and
adjusting the electric power supplied to the at least the first light source and the second light source of the at least two light sources in a descending order from highest proportion to lowest proportion by the at least one ballast based on the comparison and the ascertained respective proportions of the at least the first light source and the second light source of the at least two light sources.

2. The method according to claim 1, wherein the adjusting the power supplied to the respective light is based on an operating state stability of the respective light source with respect to the spectral light distribution of the source light output by it.

3. The method according to claim 1, wherein the adjusting the power supplied to the respective light source is based on a wavelength of an intensity maximum of the spectral light distribution of the source light output by the respective light source.

4. The method according to claim 1, wherein the adjusting the respective supplied power is based on only a control signal, the amount of which is greater than a predefined minimum value.

5. The method according to claim 1, wherein the adjusting the respective supplied power is based on individual physical characteristics of the respective light source.

6. The method according to claim 1, wherein the detecting of the light output by the lighting device includes detecting at least the light output in an area of an object lighted by the lighting device.

7. The method according to claim 1, wherein the predefined light distribution is based on physical characteristics of the lighted object.

8. The method according to claim 1, wherein the adjusting the powers supplied to the respective light sources is based on a spectral light distribution of the light detected at the lighted object.

9. The method according to claim 1, wherein the light distribution sensor is in communication link with a control device for the lighting device.

10. The method according to claim 1, wherein the light distribution sensor comprises an energy supply unit.

11. The method according to claim 1, wherein the predefined spectral light distribution is based on a spectral light distribution of the at least first spectral light distribution and second spectral light distribution.

12. The method according to claim 11, wherein the at least first spectral light distribution and second spectral light distribution are individually detected at the object to be lighted by the light distribution sensor.

13. The method according to claim 1, wherein the descending order for adjusting the electric power supplied to the at least two light sources occurs based on high wavelength to low wavelengths for the wavelengths of light emitted from the at least two light sources.

14. A control device for controlling a lighting device comprising at least two electric light sources, wherein a first light source of the at least two light sources emits a first source light with a first spectral light distribution based on a supplied first electric power, and a second light source of the at least two light sources emits a second source light with a second spectral light distribution different from the first spectral light distribution based on a supplied second electric power, wherein the first source light and the second source light are superimposed by an optical unit of the lighting device such that the lighting device outputs light with a spectral superposition light distribution, wherein the control device is configured to control at least one ballast of the lighting device such that the first electric power is supplied to the first light source of the at least two light sources and the second electric power is supplied to the second light source of the at least two light sources, wherein the control device comprises:

an evaluation unit having a light distribution sensor for detecting at least the light output by the lighting device, wherein the evaluation unit is configured to receive a sensor signal corresponding to a spectral light distribution of the light detected by the light distribution sensor; wherein the evaluation unit is configured to:

compare the sensor signal to a predefined spectral light distribution;

ascertain a respective proportion of at least a first light source and a second light source of the at least two light sources in a light flux of the light output by the lighting device;

provide at least one control signal for the at least one ballast based on the comparison; and adjust the electric power supplied to the at least the first light source and the second light source of the at least two light sources in a descending order by the at least one ballast based on the at least one control signal and the ascertained respective proportions of the at least the first light source and the second light source of the at least two light sources.

15. The lighting device comprising the control device according to claim 14; wherein the lighting device further comprises:

the first light source of at least two light sources for emitting a first source light with a first spectral light distribution;

the second light source of at least two light sources for emitting a second source light with a second spectral light distribution different from the first spectral light distribution;

the at least one ballast configured to supply a first electric power to the first light source of the at least two light sources and configured to supply a second electric power to the second light source of the at least two light sources; and the optical unit configured to superimpose the source light emitted by the at least two light sources such that the lighting device outputs light with a spectral superposition light distribution.

16. The control device according to claim 14, wherein the descending order for adjusting the electric power supplied to the at least two light sources occurs based on high wavelength to low wavelengths for the wavelengths of light emitted from the at least two light sources.

* * * * *